(12) United States Patent
Pearson

(10) Patent No.: US 7,011,902 B2
(45) Date of Patent: Mar. 14, 2006

(54) BLACK START METHOD AND APPARATUS FOR A FUEL CELL POWER PLANT, AND FUEL CELL POWER PLANT WITH BLACK START CAPABILITY

(75) Inventor: Martin T. Pearson, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 387 days.

(21) Appl. No.: 10/388,191

(22) Filed: Mar. 12, 2003

(65) Prior Publication Data
US 2004/0180243 A1 Sep. 16, 2004

(51) Int. Cl.
*H01M 8/00* (2006.01)
*H01M 8/04* (2006.01)

(52) U.S. Cl. .................................... 429/13; 429/23
(58) Field of Classification Search ............... 429/12, 429/13, 9, 23, 22
See application file for complete search history.

(56) References Cited

U.S. PATENT DOCUMENTS

| | | | |
|---|---|---|---|
| 3,959,707 A * | 5/1976 | Stephens | 320/139 |
| 5,260,637 A | 11/1993 | Pizzi | 320/6 |
| 5,519,312 A * | 5/1996 | Wang et al. | 323/360 |
| 5,723,956 A | 3/1998 | King et al. | 318/139 |
| 6,007,930 A | 12/1999 | Adams et al. | 429/13 |
| 6,061,577 A | 5/2000 | Andrieu et al. | 455/572 |
| 6,100,665 A * | 8/2000 | Alderman | 320/127 |
| 6,177,736 B1 | 1/2001 | Raiser | 307/17 |
| 6,242,120 B1 * | 6/2001 | Herron | 429/22 |
| 6,266,576 B1 | 7/2001 | Okada et al. | 700/245 |
| 6,344,985 B1 | 2/2002 | Akerson | 363/65 |
| 6,497,974 B1 | 12/2002 | Fuglevand | 429/22 |
| 6,590,370 B1 * | 7/2003 | Leach | 323/299 |
| 6,777,115 B1 * | 8/2004 | Reiser | 429/13 |
| 6,794,071 B1 * | 9/2004 | Beckmann et al. | 429/23 |
| 2003/0044661 A1 | 3/2003 | Harth | 429/26 |

FOREIGN PATENT DOCUMENTS

| | | |
|---|---|---|
| EP | 1 271 680 A2 | 1/2003 |
| GB | 2 312 999 A | 11/1997 |

OTHER PUBLICATIONS

Hamilton, D., "Electric Propulsion Power System-Overview," *IEEE*, pp. 21-28, Oct. 1996.
Patent Abstracts of Japan for JP 2002-134149, May 10, 2002.
Kötz, R. et al., "Supercapacitors for Peak-Power Demand in Fuel-Cell-Driven Cars," *ECS Proceedings* vol. PV2001-21, The Electrochemical Society, Inc., Pennington, NJ, 2002.
"ESMA Company : Applications : Transportation," retrieved Jan. 9, 2003 from http://www.esma-cap.com/Use/Transportation/?lang=English, pp. 1-5.

* cited by examiner

*Primary Examiner*—Patrick Joseph Ryan
*Assistant Examiner*—Thomas H. Parsons
(74) *Attorney, Agent, or Firm*—See IP Law Group PLLC

(57) ABSTRACT

A black start operation employs the accumulation of power resulting from a reaction of fuel and ambient oxidant passively seeped or diffused into a fuel cell stack to bootstrap the fuel cell system operation.

41 Claims, 4 Drawing Sheets

BLACK START METHOD AND APPARATUS FOR A FUEL CELL POWER PLANT, AND FUEL CELL POWER PLANT WITH BLACK START CAPABILITY

BACKGROUND OF THE INVENTION

1. Field of the Invention

The present invention relates to fuel cell electric power plants having black start capability, and black start systems and methods for fuel cell power plants.

2. Description of the Related Art

Fuel cells are known in the art. Fuel cells electrochemically react a fuel stream comprising hydrogen and an oxidant stream comprising oxygen to generate an electric current. Fuel cell electric power plants have been employed in transportation, portable and stationary applications.

Stationary and portable applications include distributed power generation, back-up power, peak power, and uninterruptible power supply (UPS) systems. Distributed power generation relates to providing electrical power to residential, commercial and/or industrial customers instead of, or as a supplement to, the utility power grid. Power plants in such applications typically operate continuously. They are particularly suited to situations where the power grid is not available or sufficiently reliable. Peak power systems are intended to supplement the power grid, providing electrical power intermittently during periods of peak use when sufficient grid power may not be available or when the rate charged by the utility increases. Back-up power and UPS systems provide electrical power during periods when the power grid, or other primary power source, is unavailable. Fuel cell power plants may also be employed in transportation applications, including cars, trucks, buses, trains, ships and aircraft.

In addition to one or more fuel cell stacks, fuel cell electric power plants also comprise associated operating, monitoring and control systems, generally referred to as the balance of plant. The balance of plant typically includes reactant supply and power conditioning systems, and may also include various other systems for reactant humidification, temperature regulation, and operational monitoring, for example. The balance of plant usually also includes a control system for controlling the operation of the power plant.

These systems include various electrical devices that require an electrical power source for operation, including blowers, compressors, regulators, sensors, powered valves and electronics, for example. Collectively, these devices represent an operational load that must be supplied with power before the fuel cell electric power plant can begin normal operation. Of course, once the fuel cell stack is producing a nominal output it can begin to power the operational load.

Known fuel cell electric power plants may employ an electrical storage device, such as secondary batteries or super capacitors, to power the operational load until the fuel cell stack is operating and can provide sufficient power to do so. The electrical storage devices may provide power to external loads as well. For example, U.S. Pat. No. 6,266,576 B1 ("Okada et al.") discloses a fuel cell unit comprising a fuel cell, a fuel cell controller and a double-layer capacitor (or other electric energy storage means). To start the fuel cell unit the fuel cell controller receives electric energy from the double-layer capacitor or an external power source. Where the double-layer capacitor is the energy source, it is charged by the fuel cell prior to shutdown or refueling to ensure the double-layer capacitor has sufficient energy to power the controller on restart. Alternatively, the external power source may be used to charge the double-layer capacitor or supply the needed power to the controller directly. While this solution is suitable for certain applications, it does have some disadvantages.

For example, in some applications the power plant may be not be used for extended periods. Over time, such electrical storage devices lose electrical energy due to self-discharge, with the result that insufficient power is available to supply the operational load of the fuel cell stack, and the power plant will not start. Damaged or defective electrical storage devices may also fail to produce sufficient power for the operational load. Thus, without an external power supply the power plant will not be able to start. As another example, situations may arise in which the power plant is required to start but the electrical storage device, though functioning properly, has been discharged. This can occur when the reactant supply of the power plant is interrupted during operation, e.g., the power plant "runs out of gas". In this situation the electrical storage device may be discharged supplying power to the external load, or may not have been adequately recharged before the fuel cell stack stopped producing power. Unfortunately, once reactant supply is re-established, the power plant will not be able to resume operation without an external power source to power the operational load. For back-up, portable and vehicular applications, in particular, where another external power source may not be available, this can be a significant problem.

It is desirable to have a fuel cell electric power plant that has black start capability, i.e., is able to start operation without requiring an external power source. The present invention addresses the disadvantages of conventional fuel cell power plants and provides further related advantages.

BRIEF SUMMARY OF THE INVENTION

In one aspect, a method of operating a fuel cell system comprising a fuel cell stack, a reactant supply system to selectively supply a reactant to the fuel cell stack, an oxidant supply system to selectively supply an oxidant to the fuel cell stack, and an electrical storage device electrically coupled to the fuel cell stack comprises: operating the reactant supply system to supply the reactant to the fuel cell stack; reacting the reactant and ambient air in the fuel cell stack to produce power; accumulating the power in the electrical storage device; and operating the oxidant supply system to supply an oxidant to the fuel cell stack after sufficient power has been accumulated in the electrical storage device to power at least the oxidant supply system.

In another aspect, a method of operating a fuel cell system to power a number of internal and external loads comprises: manually opening a reactant supply valve to supply a reactant from a reactant supply to a fuel cell stack; producing power from a reaction of the reactant and oxidant passively diffused into the fuel cell stack; accumulating the power produced from the reaction of the reactant and the oxidant passively diffused into the fuel cell stack in an electrical storage device; and supplying power from the electrical storage device to at least a first internal load after sufficient power has been accumulated in the electrical storage device to power at least the first internal load and before supplying power to the external load.

In still another aspect, a fuel cell system comprises: a fuel cell stack; a reactant supply system coupled to supply a flow of reactant to the fuel cell stack; an oxidant supply system coupled to supply a flow of oxidant to the fuel cell stack; and an electrical storage device electrically coupleable to the fuel cell stack to accumulate power produced from a reaction of the reactant and ambient air passively diffused into the fuel cell stack and further electrically coupled to supply the accumulated power to at least the oxidant supply system after sufficient power has been accumulated in the electrical storage device to power at least the oxidant supply system.

In a further aspect, a fuel cell system to supply power to internal and external loads comprises: a fuel cell stack; a reactant supply system comprising at least a first reactant supply valve that is manually actuatable to supply a flow of reactant to the fuel cell stack; an oxidant supply system selectively having at least one element selectively operable to actively supply a flow of oxidant to the fuel cell stack; and an electrical storage device electrically coupleable to the fuel cell stack to accumulate power produced from a reaction of the reactant and oxidant passively diffused into the fuel cell stack and further electrically coupled to supply power to at least a first internal load before supplying power from the fuel cell stack to the external load.

In still a further aspect, a fuel cell system comprises: a fuel cell stack; a reactant supply system selectively operable to supply a reactant to the fuel cell stack; an oxidant supply system selectively operable to actively supply a flow of oxidant to the fuel cell stack; and means for accumulating power produced by a reaction of the reactant and ambient oxidant in the fuel cell stack, and for powering the oxidant supply system to actively supply the flow of oxidant after sufficient power has been accumulated.

In yet a further aspect, a fuel cell system comprises: a fuel cell stack; a reactant supply system selectively operable to supply a reactant to the fuel cell stack; an oxidant supply system selectively operable to actively supply a flow of oxidant to the fuel cell stack; and means for accumulating power produced by a reaction of the reactant and oxidant passively diffused into the fuel cell stack, and for powering the oxidant supply system to actively supply the flow of oxidant after sufficient power has been accumulated.

BRIEF DESCRIPTION OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of the various embodiments of the invention. However, one skilled in the art will understand that the invention may be practiced without these details. In other instances, well-known structures associated with fuel cells, fuel cell stacks, batteries and fuel cell systems have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

Figure 1:
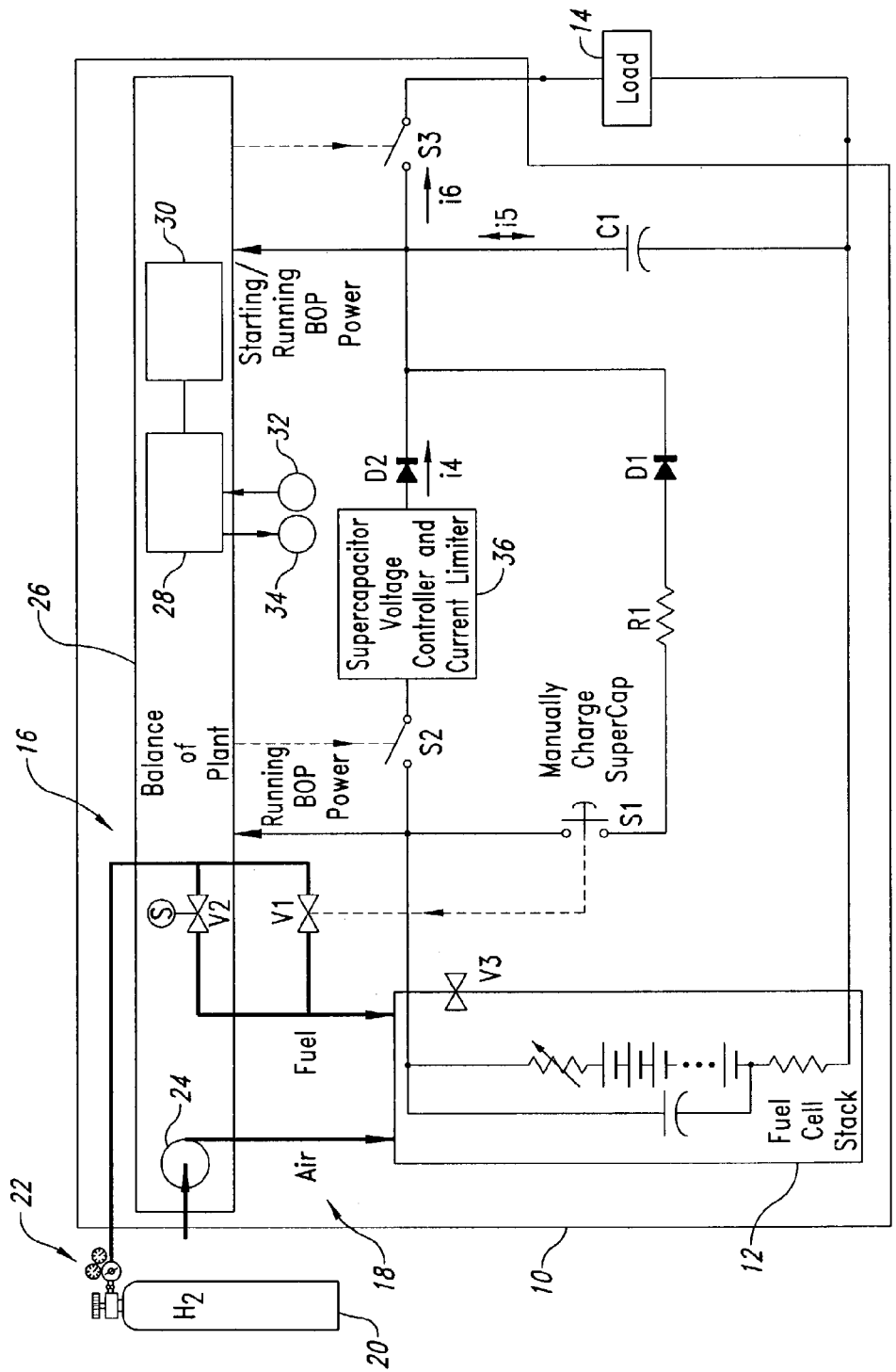
FIG. 1 is a schematic diagram of a fuel cell system comprising a fuel cell stack and appropriate hardware, software and/or logic to receive a supply of reactant from a reactant reservoir and to power internal and external loads according to one illustrated embodiment of the invention.

FIG. 1 shows a fuel cell system 10 having a fuel cell stack 12 that may be electrically coupled to provide power to one or more external loads 14. The fuel cell stack 12 may include one or more fuel cells having associated resistance and capacitance, illustrated in FIG. 1 by standard electrical schematic symbols, respectively.

In use, the fuel cell stack 12 receives a flow of fuel or reactant via a reactant supply system 16 and a flow of oxidant, for example air, via an oxidant supply system 18. The reactant supply system 16 may supply reactant from a reactant reservoir 20 which may be integrally formed with the fuel cell system 10, or may take the form of discrete units selectively coupleable to the fuel cell system 10 by way of appropriate valves and connectors 22. The reactant supply system 16 includes a first flow path between the reactant reservoir 20 and the fuel cell stack 12 that includes a first valve V1, and a second flow path between the reactant supply 20 and fuel cell stack 12 that includes a second valve V2. The second valve V2 is automatically operated under control of the fuel cell system 10, for example, via a solenoid S or other actuator. The first valve V1 is manually operable by way of a manually operated startup switch S1 to bypass the second valve V2, as illustrated by the associated broken line arrow. The oxidant supply system 18 includes at least one active component 24, for example a compressor, blower or fan, to actively supply an oxidant flow to the fuel cell stack 12.

In addition to the fuel cell stack 12, the fuel cell system 10 typically includes associated operating, monitoring and control systems generally referred to as the balance of plant 26. The balance of plant 26 may include the reactant supply system 16, oxidant supply system 18, power conditioning systems, and may include various other systems for reactant humidification, temperature regulation and/or operational monitoring. For example, the balance of plant 26 may include a controller such as a microprocessor 28, memory 30 such as random access memory ("RAM") and/or read only memory ("ROM"), and/or sensors 32 coupled to the microprocessor 28 to provide operating condition information regarding various components such as temperature, volumetric flow, and/or switch positions. The balance of plant may also include actuators, illustrated generally at 34, but also including, for example the solenoid S, for controlling various components of the fuel cell system 10. The various elements of the balance of plant 26 comprise internal loads of the fuel cell system 10, requiring power to operate, such as power from the fuel cell stack 12 or an energy storage device.

In some embodiments, the fuel cell stack 12 may include an anode purge valve V3 that may be selectively operated to purge the anode of the fuel cell stack 12. In at least one embodiment, the anode purge valve V3 may be manually actuated to allow the purging of the anode of the fuel cell stack 12 before sufficient power has been produced to automatically operate the anode purge valve V3. In at least another embodiment, the anode purge valve V3 is additionally, or alternatively, automatically operated under control of the fuel cell system 10, for example, by way of the microprocessor 28.

The fuel cell system 10 includes an electrical storage device 36, such as one or more super capacitors, electrically coupled in parallel with the fuel cell stack 12. One skilled in the art will recognize that other electrical storage devices, including storage batteries, may be suitable substitutes for super capacitors. The electrical storage device 36 accumulates power, eventually supplying power to one or more components of the balance of plant after sufficient power has been accumulated. For example, the electrical storage device 36 may accumulate power from the reaction of the reactant and ambient oxygen in the fuel cell stack 12, for example, oxidant that has passively seeped or diffused into the fuel cell stack 12 via the oxidant supply system 24. As explained more fully below, the electrical storage device 36 may provide power to the active element 24 of the oxidant supply system 18 to actively supply a flow of oxidant causing the fuel cell stack 12 to produce sufficient power to supply the internal and external loads. Thus, the fuel cell system 10 can be bootstrapped into operation.

An optional resistance R1, for example a discrete resistor, may be electrically coupled in parallel across the electrical storage device 36 by the manual activation of the startup switch S1 to limit the in-rush of current to the electrical storage device 36 during system startup (e.g., electrical storage device charging). The resistance R1 may be electrically uncoupled from across the electrical storage device 36 once the fuel cell stack 12 is providing sufficient power to at least one of the internal loads, to increase the efficiency of the fuel cell system 10 by eliminating loss associated with the resistance R1.

Diodes D1, D2 may be electrically coupled in the charging circuit to prevent the reverse flow of currents i4. A charging circuit switch S2 electrically couples and uncouples the electrical storage device 36 to the fuel cell stack 12 under control of the balance of plant, for example, under the control of the microprocessor 28 as illustrated by the associated broken line arrow. A load switch S3 electrically couples the load 14 to the fuel cell stack 12 when the fuel cell stack 12 is producing sufficient power to supply the external load 14 in addition to the internal loads. The load switch S3 is operated under control of the balance of plant, for example, under the control of the microprocessor 28 as illustrated by the associated broken line arrow. A load capacitance C1 may be electrically coupled across the load 14.

Figure 2:
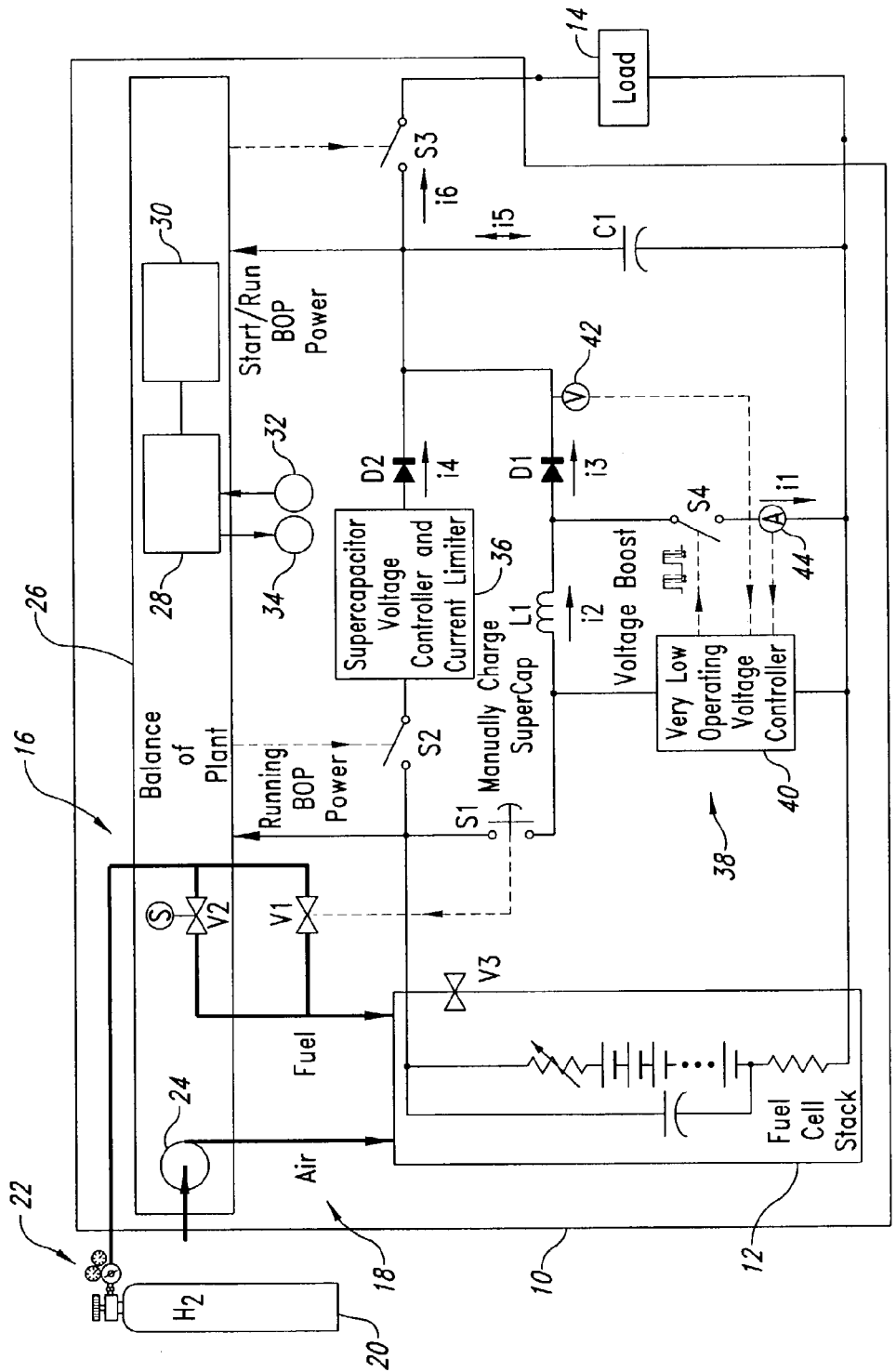
FIG. 2 is a schematic diagram of a fuel cell system according to a second illustrated embodiment of the invention.

FIG. 2 shows an alternative embodiment of the fuel cell system 10. This alternative embodiment, and those alternative embodiments and other alternatives described herein, are substantially similar to previously described embodiments, and common acts and structures are identified by the same reference numbers. Only significant differences in operation and structure are described below.

The fuel cell system 10 of FIG. 2 employs a flyback or boost converter 38 for conditioning the power supplied to the electrical storage device 36, for example, by boosting the voltage. The boost converter 38 may include an inductor L1 and a voltage controller 40, such as a very low operating voltage controller, employing pulse width modulation to operate a boost converter switch S4 based on voltage readings from a voltmeter 42 and current readings from an ammeter 44. Boost and flyback converters are well known electrical components that will not be described in detail in the interest of brevity.

Figure 3:
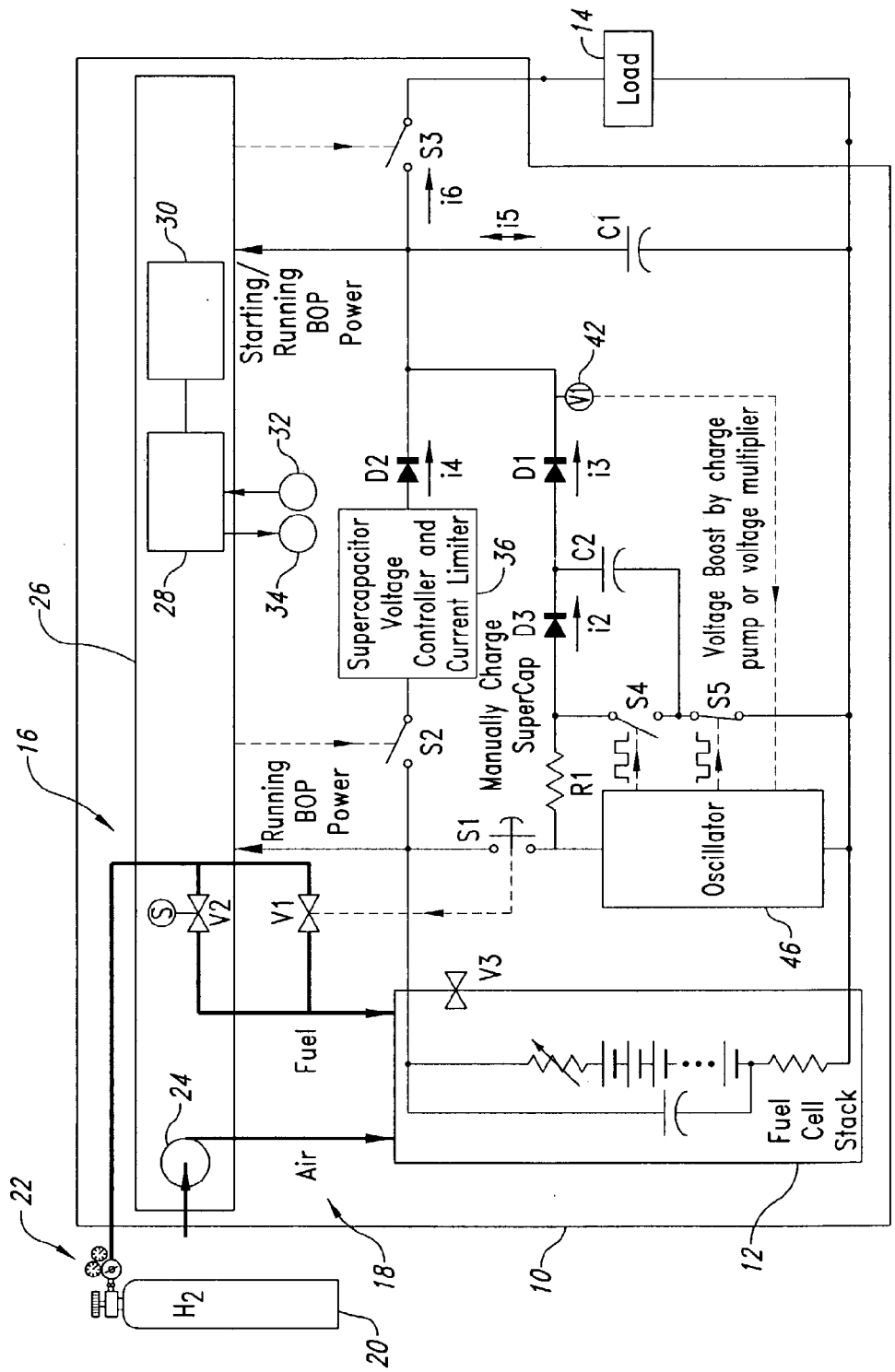
FIG. 3 is a schematic diagram of a fuel cell system according to a third illustrated embodiment of the invention.

FIG. 3 shows a fuel cell system 10 employing a charge pump or voltage multiplier circuit for boosting the voltage to the electrical storage device 36. In particular, the charging circuit may include an oscillator 46 controlling a first oscillation switch S4 according to a first timing signal and a second oscillation switch S5 according to a second timing signal which is the inverse of the first timing signal. A capacitance C2 is electrically coupled between the current limiting path (i.e., path including resistance R1) and a common node between the oscillation switches S4, S5.

Figure 4:
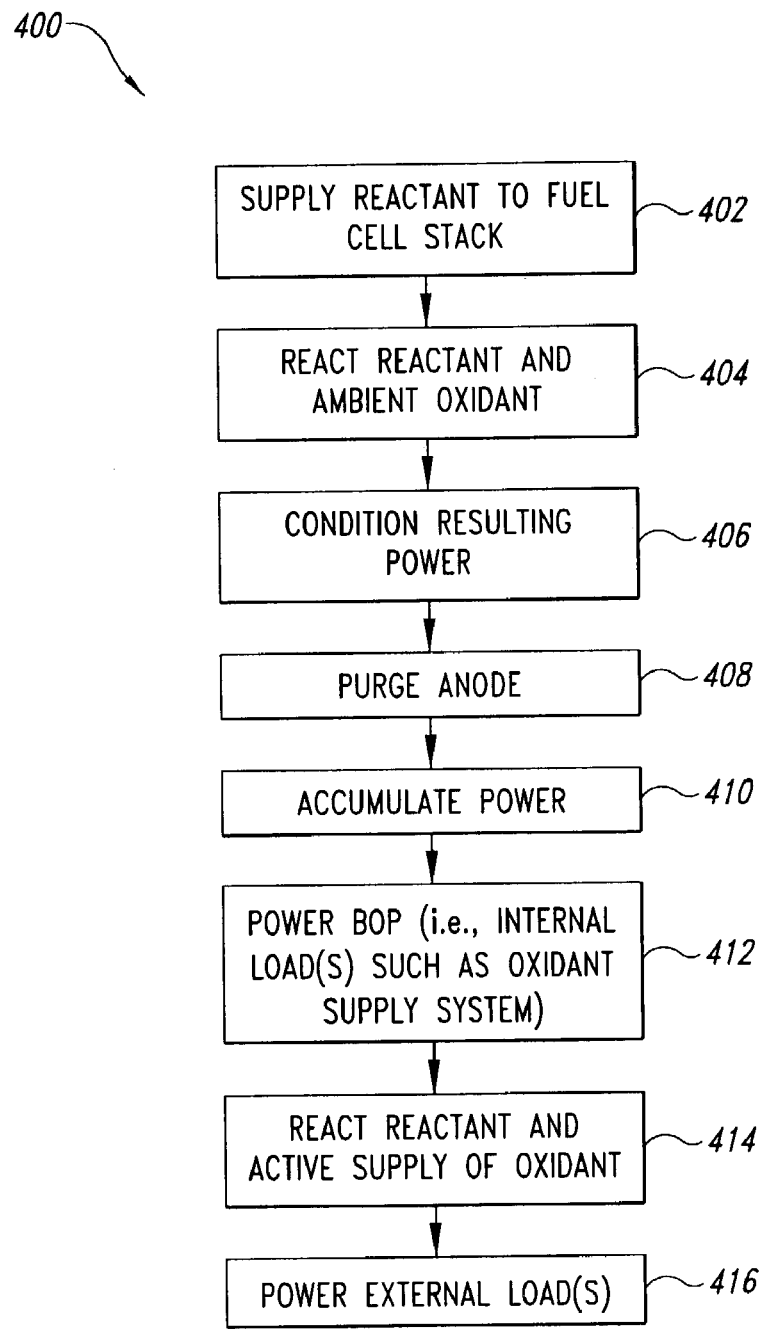
FIG. 4 is a flow diagram showing one exemplary illustrated method of operating the fuel cell stacks of FIGS. 1, 2 and 3.

FIG. 4 shows a method 400 of operating the fuel cell system 10. At 402, the reactant supply system 16 supplies reactant from the reactant reservoir 20 to the fuel cell stack 12. The reactant supply system 16 may supply reactant in response to the manual operation of the valve V1 by way of the startup switch S1. The activation of the startup switch S1 may also electrically couple the resistance R1 across the electrical storage device 36, for limiting the in-rush of current. The startup switch S1 may be such that it must be manually activated during the entire startup sequence. Alternatively, manual activation of the startup switch S1 may cause the startup switch S1 to remain closed for a defined duration equal to the typical duration of the startup sequence.

At 404, the fuel cell stack 12 reacts the reactant and ambient oxidant to produce power. The ambient oxidant may passively reach the fuel cell stack via seepage or diffusion, for example, via the oxidant supply system 18 or through other channels.

In 406, the circuitry of the fuel cell system 10 conditions the power resulting from the reaction between the reactant and the ambient oxidant. For example, the resistance R1 (FIG. 1) may perform current limiting, and/or the boost or flyback converter (FIG. 2) or the charge pump (FIG. 3) may boost the voltage.

Optionally, the anode purge valve V3 may purge the anode as illustrated at 408.

At 410, the electrical storage device 36 accumulates power. Once sufficient power has been accumulated, the electrical storage device 36 provides power to the balance of plant at 412. For example, the electrical storage device may provide power to one or more internal loads, such as the active element 24 of the oxidant supply system 18.

At 414, the fuel cell stack 12 reacts the reactant supplied by the reactant supply system 16 with the oxidant actively supplied by the oxidant supply system 18, producing sufficient power for the internal and external loads. At 416, the fuel cell system 10 closes switch S3 to electrically couple the load 14 to the fuel cell stack 12, successfully bootstrapping the fuel cell system 10. Optionally, the startup switch S1 electrically uncouples the resistance R1 from across the electrical storage device 36 once the fuel cell stack is producing sufficient power to supply the external load 14, in order to increase the efficiency of the fuel cell system 10.

In one example, the above operation can be described with reference to a NEXA™ fuel cell system available through Ballard Power Systems Inc. of Burnaby, Canada. Even without a cathode air pump operating, some oxygen or air will diffuse into the flow fields of the fuel cells and some nitrogen and/or water will diffuse out of the flow fields, allowing the fuel cell stack to produce approximately 4 Amps at 4 Volts or 16 Watts of power. The amount of power will depend on how open the cathode is to the ambient air surrounding the fuel cell stack.

Where the balance of plant requires approximately 200 W of power at greater than 18 Volts delivered for approximately 5 seconds, a total of 1000 Joules is required for startup of the fuel cell system 10. A 4.5 Farad bank of super capacitors would require 1764 Joules to charge to 28 Volts from the 16 Watts of power. Thus, it would require approximately 2 minutes to store sufficient power to such a bank of super capacitors. If used to start a NEXA fuel cell system, energy could be withdrawn from the super capacitors until the voltage of the bank of super capacitors reached 18 Volts, leaving approximately 729 Joules stored in the super capacitors. Thus, 1035 Joules would be available for starting the balance of plant.

Fuel cell power plants having black start capability do not require an external power source for starting the balance of plant or to begin normal operation. This may be a significant advantage in several applications, including:

1. In applications where the power plant may not be used for extended periods and associated electrical storage devices may be incapable of starting the balance of plant due to self-discharge.
2. In stationary and portable applications, for continued operation of the power plant after re-supply of exhausted reactants where an external power source is unavailable.
3. In transportation applications, for providing emergency starting capability when storage batteries or other electrical storage devices fail to provide enough power to start the balance of plant. For example, the operator of a fuel cell-powered vehicle would be able to start it despite a "dead" battery (or other discharged, faulty or damage electrical storage device).

All of the above U.S. patents, U.S. patent application publications, U.S. patent applications, foreign patents, foreign patent applications and nonpatent publications referred to in the this specification and/or listed in the Application Data Sheet, are incorporated herein by reference in their entirety, including but not limited to U.S. patent application Ser. Nos. 09/916,117; 09/916,115; 09/916,211; 09/916,213; and 09/916,240, all of which were filed on Jul. 25, 2001.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of operating a fuel cell system comprising a fuel cell stack, a reactant supply system to selectively supply a reactant to the fuel cell stack, an oxidant supply system to selectively supply an oxidant to the fuel cell stack, and an electrical storage device electrically coupled to the fuel cell stack, the method comprising:
    operating the reactant supply system to supply the reactant to the fuel cell stack;
    reacting the reactant and ambient air passively diffused into the fuel cell stack to produce power;
    accumulating the power in the electrical storage device while reacting the reactant and ambient air passively diffused into the fuel cell stack; and
    operating the oxidant supply system to supply the oxidant to the fuel cell stack after sufficient power has been accumulated in the electrical storage device to power at least the oxidant supply system.

2. The method of claim 1 wherein operating the reactant supply system to supply the reactant to the fuel cell stack comprises manually opening a valve between a reactant supply reservoir and the fuel cell stack.

3. The method of claim 1 wherein accumulating the power in the electrical storage device comprises accumulating power in a number of electrically coupled super-capacitors.

4. The method of claim 1, further comprising:
    limiting a rate of the accumulating of power in the electrical storage device.

5. The method of claim 1, further comprising:
    boost converting the power before accumulating the power in the electrical storage device.

6. The method of claim 1, further comprising:
    supplying a low voltage from the fuel cell stack to operate a switch mode charging circuit electrically coupled between the fuel cell stack and the electrical storage device.

7. The method of claim 1, further comprising:
    manually operating an anode purge valve before operating the oxidant supply system.

8. The method of claim 1, further comprising:
    supplying a low voltage from the fuel cell stack to operate an anode purge valve before operating the oxidant supply system.

9. The method of claim 1 wherein operating the oxidant supply system to supply an oxidant to the fuel cell stack comprises powering at least one of a compressor, a blower and a fan to actively supply air to the fuel cell stack.

10. A method of operating a fuel cell system to power a number of internal and external loads, the method comprising:
    manually opening a reactant supply valve to supply a reactant from a reactant supply to a fuel cell stack;
    producing power from a reaction of the reactant and oxidant passively diffused into the fuel cell stack;
    accumulating the power produced from the reaction of the reactant and the oxidant passively diffused into the fuel cell stack in an electrical storage device; and
    supplying power from the electrical storage device to at least a first internal load after sufficient power has been accumulated in the electrical storage device to power at least the first internal load and before supplying power to the external load.

11. The method of claim 10 wherein the first internal load is an oxidant supply system and supplying power from the electrical storage device to at least a first internal load comprises supplying power from the electrical storage device to at least one component of the oxidant supply system to actively supply oxidant to the fuel cell stack.

12. The method of claim 10, further comprising:
    supplying power from the electrical storage device to at least a second internal load after sufficient power has been accumulated in the electrical storage device to power at least the first and the second internal loads and before supplying power to the external load.

13. The method of claim 10, further comprising:
    supplying at least a portion of the power produced from the reaction of the reactant and oxidant passively diffused into the fuel cell stack to a power charging circuit electrically coupled between the fuel cell stack and the electrical storage device.

14. The method of claim 10, further comprising:
    limiting a rate of accumulating the power in the electrical storage device.

15. The method of claim 10, further comprising:
    boost converting the power produced from the reaction of the reactant and the oxidant air passively diffused into the fuel cell stack before accumulating the power in the electrical storage device.

16. The method of claim 10, further comprising:
supplying a low voltage from the fuel cell stack to operate a switch mode charging circuit electrically coupleable between the fuel cell stack and the electrical storage device.

17. The method of claim 10, wherein the first internal load is an oxidant supply system, and further comprising:
supplying a low voltage from the fuel cell stack to an anode purge valve before supplying power from the electrical storage device to the oxidant supply system.

18. The method of claim 10, further comprising:
manually operating an anode purge valve before operating the oxidant supply system.

19. The method of claim 10, further comprising:
supplying power produced from the reaction of the reactant and oxidant actively supplied to the fuel cell stack to at least a first one of the external loads, after supplying power from the electrical storage device to the first internal load.

20. A fuel cell system, comprising:
a fuel cell stack;
a reactant supply system coupled to supply a flow of reactant to the fuel cell stack;
an oxidant supply system coupled to supply a flow of oxidant to the fuel cell stack; and
an electrical storage device electrically coupleable to the fuel cell stack to accumulate power produced from a reaction of the reactant and ambient air passively diffused into the fuel cell stack and further electrically coupled to supply the accumulated power to at least the oxidant supply system after sufficient power has been accumulated in the electrical storage device to power at least the oxidant supply system.

21. The fuel cell system of claim 20 wherein the reactant supply system comprises at least one reactant supply valve that is manually actuatable to selectively control the flow of reactant to the fuel cell stack.

22. The fuel cell system of claim 20 wherein the reactant supply system comprises a first flow path and a first reactant supply valve that is electrically actuatable to selectively control the flow of reactant to the fuel cell stack via the first flow path, and a second flow path and a second reactant supply valve that is manually actuatable to selectively control the flow of reactant to the fuel cell stack via the second flow path that bypasses the first reactant supply valve.

23. The fuel cell system of claim 20, further comprising:
at least one reactant supply reservoir coupled to the reactant supply system.

24. The fuel cell system of claim 20, further comprising:
a flyback converter electrically coupled between the fuel cell stack and the electrical storage device.

25. The fuel cell system of claim 20, further comprising:
a boost converter electrically coupled between the fuel cell stack and the electrical storage device.

26. The fuel cell system of claim 20, further comprising:
a switch mode current limiting source electrically coupled between the fuel cell stack and the electrical storage device.

27. The fuel cell system of claim 20 wherein the electrical storage device comprises a number of super capacitors.

28. The fuel cell system of claim 20, further comprising:
an anode purge valve manually operable to selectively purge an anode of the fuel cell stack.

29. A fuel cell system, comprising:
a fuel cell stack;
a reactant supply system comprising at least a first reactant supply valve that is manually actuatable to supply a flow of reactant to the fuel cell stack;
an oxidant supply system having at least one element selectively operable to actively supply a flow of oxidant to the fuel cell stack; and
an electrical storage device electrically coupleable to the fuel cell stack to accumulate power produced from a reaction of the reactant and oxidant passively diffused into the fuel cell stack while the oxidant supply system is not actively supplying the flow of oxidant to the fuel cell stack and further electrically coupleable to supply power to at least one element of the oxidant supply system before supplying power from the fuel cell stack to the external load.

30. The fuel cell system of claim 29, further comprising:
a charging circuit electrically coupled between the fuel cell stack and the electrical storage device.

31. The fuel cell system of claim 29, further comprising:
a boost converter electrically coupled between the fuel cell stack and the electrical storage device.

32. The fuel cell system of claim 29, further comprising:
a switch mode charging circuit electrically coupled between the fuel cell stack and the electrical storage device, the switch mode charging circuit comprising an oscillation circuit electrically coupled to the fuel cell stack as an internal load to receive a portion of the power produced from the reaction of the reactant and oxidant passively diffused into the fuel cell stack.

33. The fuel cell system of claim 29, further comprising:
a manually operable anode purge valve.

34. The fuel cell system of claim 29, further comprising:
a microprocessor operationally coupled to control at least a portion of the fuel cell system operation and electrically coupled to the electrical storage device as a second internal load.

35. A fuel cell system, comprising:
a fuel cell stack;
a reactant supply system selectively operable to supply a reactant to the fuel cell stack;
an oxidant supply system selectively operable to actively supply a flow of oxidant to the fuel cell stack; and
means for accumulating power produced by a reaction of the reactant and ambient oxidant in the fuel cell stack while the oxidant supply system is not actively supplying the flow of oxidant to the fuel cell stack, and for powering the oxidant supply system to actively supply the flow of oxidant after sufficient power has been accumulated.

36. The fuel cell system of claim 35 wherein the means for accumulating power comprises a switch mode current limiting circuit.

37. The fuel cell system of claim 35 wherein the means for accumulating power comprises a boost converter.

38. A fuel cell system, comprising:
a fuel cell stack;
a reactant supply system selectively operable to supply a reactant to the fuel cell stack;
an oxidant supply system selectively operable to actively supply a flow of oxidant to the fuel cell stack; and
means for accumulating power produced by a reaction of the reactant and oxidant passively diffused into the fuel cell stack while the oxidant supply system is not actively supplying the flow of oxidant to the fuel cell stack, and for powering the oxidant supply system to actively supply the flow of oxidant after sufficient power has been accumulated.

39. The fuel cell system of claim 38 wherein the means for accumulating power comprises means for voltage controlling and current limiting the power produced by the reaction of the reactant and oxidant passively diffused into the fuel cell stack.

40. A method of operating a fuel cell system comprising a fuel cell stack, a reactant supply system to selectively supply a reactant to the fuel cell stack, an oxidant supply system to selectively supply an oxidant to the fuel cell stack, and an electrical storage device electrically coupled to the fuel cell stack, the method comprising:

operating the reactant supply system to supply the reactant to the fuel cell stack;

reacting the reactant and ambient air passively in the fuel cell stack to produce power;

in response to accumulating sufficient power in the electrical storage device to power at least the oxidant supply system, operating the oxidant supply system to supply the oxidant to the fuel cell.

41. The method of claim 40 wherein operating the oxidant supply system to supply an oxidant to the fuel cell stack comprises powering at least one of a compressor, a blower and a fan to actively supply air to the fuel cell stack.

* * * * *